(12) United States Patent
Tosco et al.

(10) Patent No.: US 11,033,954 B2
(45) Date of Patent: Jun. 15, 2021

(54) PLANTS FOR REGENERATING FOUNDRY SAND

(71) Applicant: FATA ALUMINUM S.r.l., Pianezza (IT)

(72) Inventors: Bartolomeo Tosco, Almese (IT); Paolo Bocca, Turin (IT)

(73) Assignee: FATA ALUMINUM S.R.L

( * ) Notice: Subject to any disclaimer, the term of this patent is extended or adjusted under 35 U.S.C. 154(b) by 348 days.

(21) Appl. No.: 16/310,822

(22) PCT Filed: Jul. 3, 2017

(86) PCT No.: PCT/IB2017/054001
§ 371 (c)(1),
(2) Date: Dec. 18, 2018

(87) PCT Pub. No.: WO2018/007928
PCT Pub. Date: Jan. 11, 2018

(65) Prior Publication Data
US 2019/0344332 A1    Nov. 14, 2019

(30) Foreign Application Priority Data
Jul. 6, 2016    (IT) .................... 102016000070232

(51) Int. Cl.
*B22C 5/08* (2006.01)
*B01J 8/18* (2006.01)
*B01J 8/26* (2006.01)
*B22C 5/18* (2006.01)
(Continued)

(52) U.S. Cl.
CPC .............. *B22C 5/08* (2013.01); *B01J 8/1836* (2013.01); *B01J 8/26* (2013.01); *B22C 5/18* (2013.01); *F27B 15/09* (2013.01); *F27B 15/16* (2013.01); *B01J 2208/00132* (2013.01)

(58) Field of Classification Search
CPC .... B22C 5/00; B22C 5/04; B22C 5/08; B22C 5/18
See application file for complete search history.

(56) References Cited

U.S. PATENT DOCUMENTS 4,549,698 A    10/1985    Andrews

FOREIGN PATENT DOCUMENTS

EP    0089927 A1    9/1983

*Primary Examiner* — Kevin P Kerns
*Assistant Examiner* — Steven S Ha
(74) *Attorney, Agent, or Firm* — Valauskas Corder LLC

(57) ABSTRACT

Plants for regenerating foundry sand are provided having a combustion chamber, which has at least one inlet for introducing sand to be regenerated into the combustion chamber, nozzles for feeding combustible gas into the combustion chamber, nozzles for injecting air so as to maintain a heated fluidized bed of sand in the combustion chamber, a cooling chamber for cooling sand coming from the combustion chamber, the cooling chamber having nozzles for blowing air in order to maintain a fluidized bed of sand in the cooling chamber, refrigerating pipes arranged above the air nozzles, a communicating duct which connects the combustion chamber with the cooling chamber, the communicating duct including a vertical or inclined lower end portion which is at least partially surrounded by or adjacent to a plurality of the refrigerating pipes in the cooling chamber, and wherein the lower end portion has a bottom outlet arranged at a lower level with respect to at least one of the refrigerating pipes.

7 Claims, 1 Drawing Sheet

(51) Int. Cl.
*F27B 15/09* (2006.01)
*F27B 15/16* (2006.01)

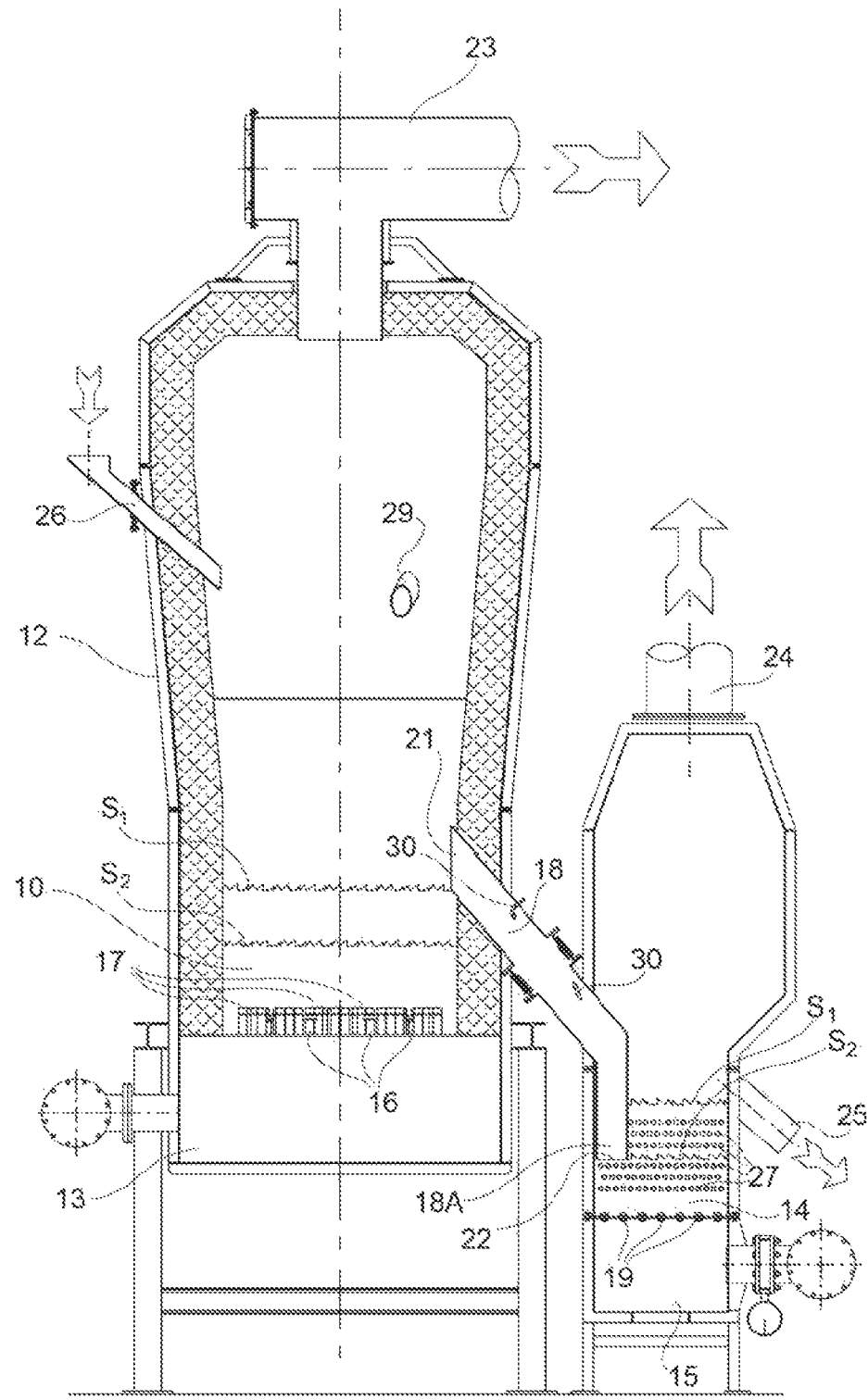

PLANTS FOR REGENERATING FOUNDRY SAND

CROSS-REFERENCE TO RELATED APPLICATIONS

This application is a National Phase Application of PCT International Application No. PCT/IB2017/054001, International Filing Date, Jul. 3, 2017, claiming priority to Italian Patent Application No. 102016000070232, filed Jul. 6, 2016, each of which is hereby incorporated by reference in its entirety.

FIELD OF THE INVENTION

The present invention relates to a plant for regenerating sands previously used in a foundry for the production of cores.

BACKGROUND OF THE INVENTION

For the production via casting of complex metallic pieces, molten metal is injected into molds where cores are positioned that reproduce the inner shape of the pieces. Sands are mixed with special resins and suitable catalysts that allow hardening to give consistency to the cores.

It is economically convenient to recycle the sand used for the production of the cores, after eliminating the residues of resins, catalysts and other impurities contained in it.

Foundry sands are regenerated by means of thermal-type plants or mechanical-type plants. Thermal-type plants perform a combustion of organic resins covering the surface of the grain of sand; mechanical-type treatments produce a mechanical abrasion on the grain surface, obtained through mechanical friction by mechanically agitating the sand grains at high speed.

Most of the aluminum foundry sand regeneration plants are currently of the thermal type, and the resins used to form the cores are predominantly organic, derived from petroleum (phenolic and furanic resins, etc.).

The processes of forming the cores include both cold-forming ("cold box") where the hardening reaction is instantaneous through a gaseous catalyst (amine or $SO_2$), and hot-forming ("hot box") where the reaction occurs via the effect of temperature but is still fast enough for industrial practice.

An issue related to the use of organic resins is that, when casting (at temperatures of 700-800° C.), they develop gases that need to be removed, so as not to be imprisoned in the casting, and abated, as they are noxious. To abate these gaseous emissions, post-combustion abatement systems are required, which have extremely high running costs. This has prompted some resin producers to consider using inorganic-type resins as binders for the cores, which do not develop gases or develop them in an extremely small amount. Inorganic-type resins are predominantly silicates, phosphates, borates or the like, in some way soluble in water, which, by means of hot forming, yield the water of solubilization and harden. Sands with inorganic-type resins involve high disposal costs and may create ecological problems because of soluble sodium compounds, which generate highly basic compounds, hence the need to develop systems for the regeneration of such sands.

There are known foundry sand regeneration plants which include a combustion chamber, wherein a combustible gas is added to the sand to be regenerated to burn the resins, and a cooling chamber, wherein the sand from the combustion chamber is cooled to room temperature or slightly higher. A communicating duct connects the combustion chamber with the cooling chamber. The sand transfer occurs by gravity. Both chambers have nozzles that inject the air upward to create, in each chamber, a fluidized bed of sand. The connecting duct is fitted with a valve or other mechanical shutter that is closed when the plant is stopped or operating in starting up or shutting down transitions. The blocking of the connecting duct serves to prevent the combustion chamber (generally found at a higher level than the cooling chamber) from being emptied and to keep the two sand beds in the desired proportions also during the starting up and shutting down transitions. The valve, when closed during a shutting down phase, causes the formation of a static sand volume at the end part of the duct towards the cooling chamber. This static volume, when heated at the act of restarting the plant after a shutdown phase, blocks the passage of the sand to the cooling chamber. In operation with sands bonded with organic resins, at the opening of the valve, the sand begins to flow freely by gravity from the furnace to the cooler, initiating the regular flow of sand that occurs during the normal operation of the plant. Conversely, in the case of thermal regeneration of sand bound with inorganic resins, especially in the case of regeneration temperatures on the order of 800-850° C., the static volume of sand due to the low melting temperature of the inorganic resin itself is lower than 800-850° C. and tends to form a soft/rigid block, and in any case, such as to prevent the free flow of sand by gravity and thus making it impossible to achieve normal operation.

SUMMARY OF THE INVENTION

It is object of the present invention to overcome the aforementioned drawback of the prior art and, in particular, to reduce plant management costs.

This and other objects and advantages, which will be better understood later, are achieved by a sand regeneration plant having the features as described and claimed herein.

In summary, the communicating duct connecting the combustion chamber with the cooling chamber, has a vertical or inclined lower end portion which is at least partially surrounded by a plurality of refrigerating pipes in the cooling chamber, or is adjacent to at least one of said refrigerating pipes within the cooling chamber. When the plant is stopped, the sand remaining at the end of the duct is quickly cooled and acts as a cap, stopping the descent of the sand toward the cooling tank and maintaining therefore the right amount of sand in the combustion chamber. When the plant is restarted, the sand in the cooling tank is again fluidized; consequently, the sand cap at the end of the duct is fluidized and the plant resumes its operation without requiring any intervention.

BRIEF DESCRIPTION OF THE FIGURE

FIG. 1 shows a schematic vertical sectional view of a representative form of a regeneration plant according to an embodiment of the present invention.

DETAILED DESCRIPTION

Functional and structural features of certain non-limiting embodiments of a plant for regenerating sands according to the invention will now be described.

A plant for regenerating foundry sand, comprises a combustion chamber 10 and an adjacent cooling chamber 14, communicating with the combustion chamber 10 through a partly inclined communicating duct 18.

The combustion chamber 10 is located within a furnace 12, while the cooling chamber 14 is located adjacent to the furnace. The combustion chamber 10 has a cylindrical inner wall, preferably vertical or almost vertical. For example, the wall may be inclined by 85° with respect to a horizontal plane. The verticality or near verticality of the wall serves to avoid the formation of accumulations and hard blocks of sand, which becomes sticky at temperatures above the beginning softening temperature of the inorganic resin, starting indicatively at 600-650° C.

Below the combustion chamber 10 and the cooling chamber 14 there are respective air inlet chambers 13, 15, from which the air is injected upwardly into the combustion chamber 10 and in the cooling chamber 14 through respective nozzle supply systems 17, 19. The air is flushed through the nozzles 17, 19 so as to keep the sand in conditions of fluidization within the chambers 10 and 14.

The fluidized sand in the cooling chamber 14 is at a lower level than the fluidized sand contained in the combustion chamber 10. In a high part of furnace 12, an inlet 26 is placed to introduce the sand to be regenerated into the combustion chamber 10. The inclined communicating duct 18 has a top inlet 21 which opens into the combustion chamber 10 and a bottom outlet 22 that opens into the cooling chamber 14.

From the cooling chamber 14 branches an inclined discharge duct 25 for the regenerated and cooled sand.

From the top of the furnace 12 branches a discharge duct 23 for the combustion gases. From the top of the cooler branches a discharge duct 24 for the fluidization air of the cooling chamber 14.

Supply nozzles 16 of combustible gas are distributed to the base of the combustion chamber, suitably alternating with the air fluidization nozzles 17 positioned on a same base plate.

A pilot burner 29, which serves to ensure the presence of a flame ignited in the combustion chamber, is advantageously placed in a high position inside the furnace, in a position unattainable by the sand flows to prevent sand grains from depositing on the burner and adhering to the same due to the high temperature.

Inside the cooling chamber 14 are distributed, at various levels or heights, refrigerating pipes 27 within which cold water circulates. The outlet 22 of the connecting duct 18 opens at an intermediate level between the refrigerating pipes 27. The inclined connecting duct 18 has a lower end portion 18*a*, near the bottom outlet 22, which is at least partially surrounded by or adjacent to or close to one or more of one of the refrigerating tubes 27.

In the illustrated example, the lower end portion 18*a* is substantially vertical. The lower end portion 18*a* may be substantially vertical, i.e. vertical or almost vertical, or in any case inclined with respect to a horizontal line, with an angle that favors the outflow of the sand from the duct 18 into the cooling chamber 14.

Preferably, the bottom outlet 22 is facing and situated above at least one of the refrigerating tubes 27.

Advantageously, the lower end portion 18*a* is devoid of mechanical closing valve devices.

The operation of the plant is as follows. The sand used in the foundry and loaded with residual resins, catalysts and impurities is fed by the inlet 26 into the combustion chamber 10, where combustible gases are fed through the nozzles 16 and air blown through the nozzles 17 located at the bottom of the combustion chamber.

In the combustion chamber 10, the thermodynamic and fluid-dynamic conditions necessary for triggering and maintaining combustion reactions of the resin mixed with the sand are achieved. Preferably, the inflow of combustible gas into chamber 10 is controlled in such a way as to work at the highest possible temperature, ideally within a range of 800-850° C.

The air flow rate within the combustion chamber 10 must be such as to keep the grains of sand in conditions of fluidization. For silica sand grain sizes comprised between 0.15 and 0.5 mm, the air flow rate may be comprised indicatively between approximately 0.1 and 1 m/s.

During normal operation of the plant, the sand flows out by gravity in conditions of fluidization from the combustion chamber 10 to the cooling chamber 14 through the inclined duct 18.

The sand that passes into the cooling chamber 14 is maintained under fluidization conditions and is progressively cooled by the combined effect of the fluidization air, injected upward from the nozzles 19 and the heat exchange effected by the refrigerating tubes 27 in which cold water circulates.

S1 and S2 indicate the free surface levels of sand in the two chambers, both in the fluidization state (S1) and at rest (S2).

The regenerated cold sand is discharged from the duct 25. The ducts 18 and 25 are spaced at the ends or opposite sides of the cooling chamber 14.

In the event of a blockage or shutdown of the plant, the sand present in the cooling chamber ceases to be fluidized and therefore stops, stopping also the descent of the sand contained in the inclined duct 18. The inclined duct fills with sand. The end portion 18*a* of the duct 18 is immersed in the sand of the cooling chamber and is therefore surrounded by relatively cold sand because it is in contact with the refrigerating tubes 27. The outflow of sand from the combustion chamber 10 is thus interrupted. In the combustion chamber 10, a correct level of sand is maintained. The furnace therefore does not empty itself of the sand yet to be regenerated, at least partially.

The sand contained in the upper portion of the inclined duct 18 is still hot and may tend to stick in the absence of the fluidizing air. However, after a shutdown period, the temperature of the sand falls below the limit of stickiness, bringing the sand back to the free grain state.

When the plant is restarted, the fluidized sand in the furnace reaches the calcination temperature (800-850° C.), while the sand contained in the duct 18 remains initially cold due to thermal inertia. The fluidization air resumes flowing out from the nozzles 19 and fluidizes the sand in the cooling chamber 14 and also the sand contained in the end 18*a* or lower portion of the duct 18, which has remained cold, being cooled by the tubes 27 of the cooling tube bundle. The sand contained within the duct 18 may descend because it is below the temperature of stickiness and because the sand beneath the outlet 22 of the duct 18 is fluidized.

By virtue of the position of the duct 18, the end part of which is immersed in the cooling chamber, the plant may quickly restore its functionality even after long or short breaks. Problems due to conventional stopping devices of the communicating duct between the combustion and cooling chambers are avoided to reduce management and maintenance costs.

The duct 18 may be provided with one or more optional auxiliary nozzles 30 for introducing pressurized air jets or impulses into the duct 18. Pressurized air from the auxiliary nozzles 30 helps to move the sand contained in the end 18*a* or lower portion of the duct 18 when the plant is restarted. The jets provided by the auxiliary nozzles 30 may be oriented indifferently upwards and/or downwards.

Several aspects and embodiments of the plant have been described. It is understood that each embodiment may be combined with any other embodiment. The invention, moreover, is not limited to the described embodiments, but may be varied within the scope of protection as described and claimed herein.

The invention claimed is:

1. A plant for regenerating foundry sand, comprising:
    a combustion chamber, which comprises
        at least one inlet for introducing sand to be regenerated into the combustion chamber,
        nozzles for feeding combustible gas into the combustion chamber,
        nozzles for injecting air so as to maintain a heated fluidized bed of sand in the combustion chamber;
    a cooling chamber for cooling sand coming from the combustion chamber, the cooling chamber comprising
        nozzles for blowing air so as to maintain a fluidized bed of sand in the cooling chamber;
        refrigerating pipes arranged above the air nozzles;
    a communicating duct which connects the combustion chamber with the cooling chamber;
    wherein the communicating duct comprises a vertical or inclined lower end portion which is at least partially surrounded by or adjacent to a plurality of the refrigerating pipes in the cooling chamber, and wherein
    the lower end portion has a bottom outlet arranged at a lower level with respect to at least one of the refrigerating pipes.

2. The plant of claim 1, wherein the bottom outlet is facing and situated above at least one of the refrigerating pipes.

3. The plant of claim 1 wherein the communicating duct comprises
    an upper inclined portion, having an upper inlet that opens on the combustion chamber and
    said lower end portion.

4. The plant of claim 1 wherein the communicating duct has no mechanical closure devices.

5. The plant of claim 1 further comprising at least one pilot burner arranged at a high level within the combustion chamber, in a position unreachable by the fluidized bed of sand.

6. The plant of claim 1, wherein the combustion chamber has a vertical cylindrical inner wall.

7. The plant of claim 1 wherein the communicating duct is provided with one or more auxiliary nozzles for inputting jets or impulses of pressurized air into the communicating duct.

* * * * *